(12) United States Patent
Sahuguet

(10) Patent No.: US 7,940,171 B2
(45) Date of Patent: May 10, 2011

(54) MACHINE-READABLE REPRESENTATION OF GEOGRAPHIC INFORMATION

(75) Inventor: Arnaud Sahuguet, New York, NY (US)

(73) Assignee: Google Inc., Mountain View, CA (US)

( * ) Notice: Subject to any disclaimer, the term of this patent is extended or adjusted under 35 U.S.C. 154(b) by 322 days.

(21) Appl. No.: 12/136,648

(22) Filed: Jun. 10, 2008

(65) Prior Publication Data
US 2009/0303036 A1    Dec. 10, 2009

(51) Int. Cl.
*G08B 1/08* (2006.01)
(52) U.S. Cl. .............................. 340/539.13; 235/426.11
(58) Field of Classification Search ............. 340/539.13; 235/462.01, 462.11, 462.45, 462.46, 472.02; 382/305; 709/219
See application file for complete search history.

(56) References Cited

U.S. PATENT DOCUMENTS

| | | | |
|---|---|---|---|
| 6,675,165 B1 | 1/2004 | Rothschild | |
| 7,156,311 B2 | 1/2007 | Attia et al. | |
| 7,419,097 B2 * | 9/2008 | Lee et al. | 235/462.11 |
| 2002/0026500 A1 * | 2/2002 | Kanefsky et al. | 709/219 |
| 2002/0090132 A1 * | 7/2002 | Boncyk et al. | 382/305 |
| 2002/0195495 A1 * | 12/2002 | Melick et al. | 235/462.01 |
| 2006/0065733 A1 | 3/2006 | Lee et al. | |
| 2007/0123308 A1 | 5/2007 | Kim et al. | |
| 2008/0245870 A1 | 10/2008 | Lee et al. | |
| 2008/0247363 A1 | 10/2008 | Lee et al. | |

FOREIGN PATENT DOCUMENTS

| | | |
|---|---|---|
| KR | 10-2004-0079625 | 9/2004 |
| KR | 10-2004-0082789 | 9/2004 |
| WO | WO2004/080097 | 9/2004 |

OTHER PUBLICATIONS

Korean Authorized Officer Dae Shik Im, International Search Report and the Written Opinion for Application No. PCT/US2009/046776, Dec. 29, 2009, 13 pages.
Authorized Officer Nora Lindner, International Preliminary Report on Patentability for Application No. PCT/US2009/046776, Dec. 23, 2010, 8 pages.

* cited by examiner

*Primary Examiner* — John A Tweel, Jr.
(74) *Attorney, Agent, or Firm* — Fish & Richardson P.C.

(57) ABSTRACT

A computer-implemented location identification method involves obtaining a digital image of a machine-readable representation encoded with a geographic location identifier that is associated with a geographic location, decoding the image of the machine-readable representation to produce the geographic location identifier, and presenting content related to the geographic location and identified using the decoded geographic location identifier.

23 Claims, 9 Drawing Sheets

MACHINE-READABLE REPRESENTATION OF GEOGRAPHIC INFORMATION

TECHNICAL FIELD

This document relates to using a portable device to access and use geographic information encoded in a machine-readable representation located at a geographic location.

BACKGROUND

Handheld electronic devices, such as cellular telephones, are routinely carried and used by large segments of the population. Many people today would not think of leaving home without their mobile phone, whether they are departing for work, leaving on a vacation, venturing out to shop about town, departing for dinner or a movie, or just enjoying a relaxing stroll around the neighborhood. As cellular carriers have expanded network coverage to include an ever-increasing national and international calling area, cellular telephones have become ubiquitous communications facilitators for everyone from businesspeople to students. Similarly, advances in technology have enabled cell phone manufacturers to reduce the size of mobile phones and offer improved form factors, thereby fueling the devices' popularity. Technology advances have also made possible the inclusion of features beyond the original voice communications. For example, text messaging capability is now common on mobile phones, as is the capability to access the Internet. A recent advance involves integrating a digital camera within the mobile phone. Using a camera-equipped phone, a user can capture an image using the digital camera, store the image in memory, upload the image to a remote storage location via a network, or transmit the image to another user.

It is known to use mobile phones to obtain location-based information. For instance, some mobile phones include global positioning system (GPS) functionality, which can be used determine a location via communication with GPS satellites. Users of GPS-equipped phones may typically subscribe to a GPS navigation service through their cellular provider. However, GPS functionality on mobile devices may be expensive, and may be difficult to use. Additionally, because satellite communication is required to determine a location using GPS, and because GPS satellites orbit the earth in prescribed orbital planes, use of GPS on a mobile device may require an unobstructed view of a particular region of the sky to facilitate such communication. This may be problematic in areas where unobstructed skyward views are in short supply or not available at all. For example, GPS functionality may not be possible in dense metropolitan areas where large buildings block direct skyward views of the GPS satellite orbital paths. Also, some people have privacy concerns with GPS technology, and may not wish to carry a device that may permit precise tracking without their consent.

SUMMARY

This document discusses systems and techniques by which information representing a geographic location may be encoded in a machine-readable representation, and that representation may be printed and displayed at the geographic location. Users may then capture digital images of the representation and have it decoded to determine the geographic location. Where there is a particular pre-defined relationship between the code and particular locations, the encoding and decoding can be conducted on a device without a need to access a central information source. For example, a particular algorithm may be loaded onto a device for making such a conversion from code to location.

Such information may be generated in various manners and may be used in various manners. For example, a user can create a machine-readable representation by selecting a location on an on-line mapping application, which may then generate a web page containing a two-dimensional barcode or similar code, and the user may print the code onto an adhesive label that may then be displayed to the public. Such a code may be used, for example, to provide users in the area with particular information about an object in the area, to generate a coupon (e.g., for a fast-food restaurant) and to provide for reporting on the redemption of the coupon, and for other similar purposes.

In one general implementation, a computer-implemented location identification method is disclosed. The method includes obtaining a digital image of a machine-readable representation encoded with a geographic location identifier that is associated with a geographic location. The method also includes decoding the image of the machine-readable representation to produce the geographic location identifier. The method further includes presenting content related to the geographic location and identified using the decoded geographic location identifier.

In various implementations, obtaining the image of the machine-readable representation may include capturing a digital picture of the machine-readable representation. Decoding the image of the machine-readable representation may include comparing the image to representations stored in a database, or may include first obtaining a non-location-based identifier that is associated with the geographic location identifier, and using the non-location-based identifier to obtain the geographic location identifier. The geographic location may be a latitude-longitude coordinate pair. The method may further include transmitting the geographic location identifier to a central server system and receiving, from the central server system, the content associated with the geographic location, where the central server system identifies the content using the geographic location identifier. Decoding the image may include accessing a database that contains pre-defined correlations between particular machine-readable representations and particular geographic locations. The content associated with the geographic location may include two or more members of a group consisting of a map, a coupon, a comment, and a review.

In another general implementation, a computer-implemented location identification method includes associating a geographic location identifier with a geographic location. The method also includes encoding the geographic location identifier in a machine-readable representation for display at the geographic location. The method further includes supplying the machine-readable representation to a third party for display at the geographic location.

In yet another general implementation, a computer-implemented system includes a code generator to provide machine-readable visual codes for presentation at geographic locations. The system also includes a database storing correlations between the codes and location identifiers submitted by third party users in association with requests to provide information relating to the geographic locations. The system further includes an image analyzer to identify a location identifier associated with a machine-readable code submitted in an electronic image.

In yet another general implementation, a computer-implemented system includes a digital camera to capture images of location information encoded in a machine-readable format. The system also includes a decoder to convert codes in the images to an alpha-numeric representation, and means for associating the alpha-numeric representation with a geographic location and delivering location-related information for review on a device containing the digital camera.

In yet another general implementation, a computer-implemented location identification system includes a code generator to provide machine-readable visual codes for presentation at geographic locations. The system also includes a database storing correlations between codes and location identifiers submitted by third party users in association with requests to provide information relating to the geographic locations. The system further includes a media server to transmit the information in response to receipt of a location identifier correlated in the database to the information.

In yet another general implementation, a computer-implemented location identification method includes associating a geographic location identifier with a geographic location and encoding the geographic location identifier in a machine-readable representation to be displayed at the geographic location. The method also includes receiving by electronic communication from a remote device a request comprising the geographic location identifier. The method further includes supplying to the remote device content related to the geographic location and identified using the received geographic location identifier.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
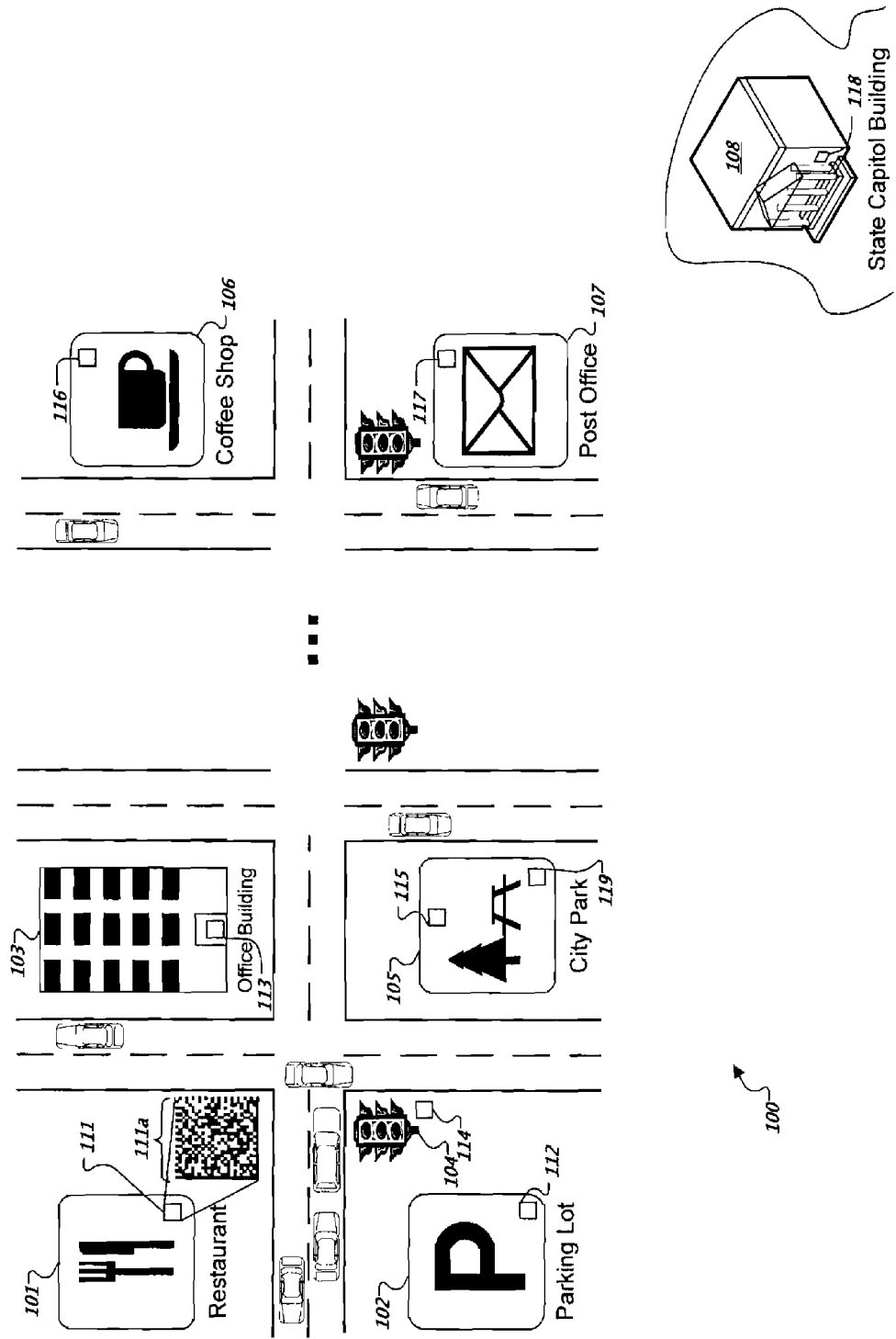
FIG. 1 is a block diagram of a portion of a city showing an exemplary environment that includes machine-readable representations for encoding geographic information.

FIG. 1 is a block diagram of a portion of a city showing an exemplary environment 100 that includes machine-readable representations 111-119 for encoding geographic information. In an implementation, each machine-readable representation 111-119 may be a linear or two-dimensional representation, such as a barcode or a two-dimensional barcode, and may encode information associated with a location, a structure, a landmark, a business, or an attraction, to list just a few examples. In an implementation, the representations 111-119 encode geographic information associated with the corresponding location, structure, landmark, business, or attraction. In some implementations, the machine-readable representations 111-119 can be distributed to various locations throughout the environment 100 for presentation in association with the corresponding location, structure, landmark, business, or attraction.

According to an implementation, a machine-readable representation may be scanned or captured by a mobile device and decoded to obtain the encoded information. In some implementations, a mobile phone equipped with a digital camera may be used to capture an image of the representation, after which the mobile device may decode the representation to obtain the associated geographic information. In addition to geographic information, additional information may be encoded in one or more of the machine-readable representations 111-119. Examples may include information pertaining to the associated location, structure, landmark, business, or attraction, according to some implementations. In some implementations, the encoded geographic information can be used to provide additional content to the user of the mobile device. In some implementations, information encoded by the machine-readable representation may be cryptographically signed. In this manner, a mobile device user may quickly and conveniently obtain geographic information or additional content.

FIG. 1 shows a restaurant 101, a parking lot 102, an office building 103, a traffic signal 104, a park 105, a coffee shop 106, a post office 107, and a capitol building 108, each of which have one or more machine-readable representations associated with them. More particularly, a representation 111 is associated with the restaurant 101; a representation 112 is associated with the parking lot 102; a representation 113 is associated with the office building 103; a representation 114 is associated with the traffic signal 104; a first representation 115 and a second representation 119 are associated with the park 105; a representation 116 is associated with the coffee shop 116; a representation 117 is associated with the post office 107, and a representation 118 is associated with the capitol building 108.

The first and second park representations 115, 119 may be respectively associated with a monument (not shown in FIG. 1) and a picnic area within the park 105, for example. An example of a two-dimensional barcode is shown in a blown-up portion 111a of the restaurant's machine-readable representation 111.

The machine-readable representations 111-119 can be affixed to various surfaces at the various locations. The restaurant's machine-readable representation 111 may be affixed on or near a door of the restaurant 101; the parking lot's machine-readable representation 112 may be affixed to the pavement of the parking lot 102 or to a sign associated with the lot 102; the office building's machine-readable representation 113 may be attached near an entrance to the office building 103 (e.g., near or on a door, such as an automatic sliding door or a revolving door); the traffic light's representation 114 may be attached to a pole of a traffic light 104; and the park monument's representation 115 may be affixed to a base of the monument, to list just a few examples.

The foregoing examples are intended to be illustrative, and it will be appreciated that the machine-readable representations may be positioned at any desired location in the environment 100, and may encode geographic information associated with the desired location. In an implementation, one or more of the machine-readable representations 111-119 may be positioned such that mobile device users may readily access the representations 111-119, as by scanning or photographing the representations with a mobile device, such as a mobile phone.

The machine-readable representations 111-119 can each specify a geographic location. In some implementations, location identifiers that are associated with geographic locations can be encoded in the machine-readable representation. Geographic locations can be represented by an address, a set of coordinates (e.g., a latitude and longitude pair), an altitude, an orientation, a number, and the like. For example, the machine-readable representation 111 can specify a location of the restaurant 101 as a latitude and longitude coordinate-pair (e.g., (37.419, -122.1419)) or as a numerical identification (e.g., 31415926). In an implementation, the machine-readable representation may specify a unique identifier that identifies geographic location information, information about the associated entity, a combination of the above, or additional information.

A user may use a handheld device to capture or scan the machine-readable representations. In one implementation, a user uses a camera-equipped mobile phone to photograph the machine readable-representation. The representation may be decoded locally on the phone to obtain an identifier, where the encoding of the location information follows a pre-arranged standard and the phone follows the same standard. According to some implementations, the identifier may be a location identifier. For example, the identifier may be a geographic location identifier. In some implementations, the machine-readable representation may be decoded to obtain a non-location-based numeric identifier, which may then be associated with a corresponding location identifier.

The location identifier may be used to generate additional content. For example, additional content related to the location where the representation was captured, or to the corresponding entity (e.g., restaurant 101, office building 103, etc.) associated with the representation may be generated. In some implementations, content associated with other entities may be generated. For example, content associated with one or more other, nearby entities may be generated. As an illustrative example, a pedestrian standing near the intersection by the traffic light 104 may capture the associated barcode or two-dimensional barcode 114 with a camera-equipped mobile phone. The barcode or two-dimensional barcode 114 may be decoded within the device and content associated with the restaurant 101, located just across the street in FIG. 1, may be generated and presented to the user on the device. In one implementation, the content may be an advertisement for the restaurant 101. In another implementation, the content may be a coupon redeemable at the restaurant 101. In some implementations, location-aware information, such as a review or a comment, may be presented. In various implementations, the mobile device may alternatively include a scanner for reading the machine-readable representations, such as a barcode scanner.

The machine-readable representations can include a visual component. For example, visual machine-readable representations can include a one-dimensional bar code (e.g., a UPC code), a two-dimensional bar code (e.g., a two-dimensional barcode), and the like. Two-dimensional barcodes are two-dimensional encodings that may be capable of encoding ASCII representations, numerical representations, text representations, and combinations thereof. Some examples of two-dimensional barcodes include QR codes and Data Matrix codes.

The machine-readable representations can be placed in geographically diverse locations. For example, the representations can be placed several miles away within the same city (e.g., at restaurant 101 and at coffee shop 106). Additionally, the representations can be placed in different cities, states and countries. For example, representation 118 can be placed on the state capitol building 108 that is geographically distant, such as in a distant city, from other locations 101-107 in FIG. 1. It will be appreciated that the representations may be located anywhere, and may encode geographic information pertaining to the particular location of the representation, according to an implementation.

Visual representations may also be accompanied by human-readable and understandable representations in certain circumstances. For example, the same information that is encoded in the machine-readable representation may be repeated near the representation, but in a human readable form. Also, textual explanations or instructions may be printed near the representation, e.g., "send a photo of this code to www.xyz123.com to get a cheeseburger electronic coupon via MMS."

The machine-readable representations can also include non-visual components. For example, an RF tag can be affixed to the surface as a replacement or in addition to the visual representation. The type of machine-readable representation can determine the type of handheld device capture mechanism appropriate for reading or capturing the representation. In an implementation, a combination of machine-readable representations can be used. By way of nonlimiting example, machine-readable representation 117 may be an RF tag, for instance, while machine-readable representation 116 may be a two-dimensional barcode.

If the representation includes a visual component, for example, a user can use a camera-equipped handheld device (that is, a handheld device with an integrated digital camera) to take a digital picture of the representation. Alternatively, in some implementations, the capture device can be a peripheral device. For example, the user may use a peripheral or standalone digital camera to photograph the representation and then transfer the image to the handheld device. In this case, the digital camera or RF reader can be attached to the handheld device through a card slot, a universal serial bus (USB) port, and the like. If the machine-readable representation includes a non-visual component, such as an RF tag, the handheld device can use an RF reader to capture the representation, according to an implementation. As previously mentioned, barcode scanners, whether integrated within the handheld device or peripheral, can also be used.

According to an implementation, a capture device on the handheld device can be manually activated by a user each time a machine-readable representation is accessed. This may permit the user to have control over when, where, and how often the user uses the handheld device to capture or read machine-readable representations. As such, privacy concerns associated with undesired location tracking may be alleviated because undesired location tracking may be avoided using techniques disclosed herein, according to some implementations. If a user is interested in using the mobile phone to acquire geographic information, the user may intentionally capture an image of the machine-readable representation for decoding, but need not worry that undesired or transparent location monitoring may be occurring, for example.

The handheld device can use an integrated decoder to translate the machine-readable representation into a location identifier. The location identifier can then be used to reference location information described by the machine-readable representation. In some implementations, an intermediate step of obtaining a numerical identifier from the machine-readable representation may occur. For example, a user may use a camera-equipped mobile phone to capture an image of the two-dimensional barcode 111*a* and a decoder may decode the image to a hexadecimal representation of the image (e.g., 0xB91F57). The numerical representation (0xB91F57) may then be decoded to obtain a location identifier, such as "_p~iF~ps|U."

In an implementation, the machine-readable representation may be fully decoded locally on the handheld device. Alternatively, full or partial decoding may occur external to the handheld device, such as at a remote computing system. According to some implementations, an image of the machine-readable representation may be transmitted to an external computing system, such as a remote server device, where the representation may be decoded and location information accessed. As yet another alternative, the handheld device may decode the representation to obtain a numeric identifier or a location identifier, and may then transmit this identifier to a server where location information and other information may be accessed and retrieved. The handheld device is described in more detail below with reference to FIG. 2.

In implementations where the representation is decoded on the handheld device, the decoded location identifier, or in some cases the decoded geographic location, can be transmitted to one or more remote server devices. In examples where a decoded location identifier is transmitted to the server, the server can use the location identifier to reference a previously defined correlation to determine the corresponding geographic location. The server can use the decoded information to access content related to the geographic location. As described previously, in some implementations this content can be initially associated with the geographic location. The server can then transmit the content to the handheld device, on which the user can advantageously access the content while still in proximity to the geographic location. For example, the server can generate a map identifying an area of interest, such as an area detailing a portion of the city, and can transmit it to the handheld device. Additionally, the map can be visibly marked with one or more areas of interest, such as the city park 105, the restaurant 101, or the coffee shop 106, to list just a few examples.

In an implementation, the user may be able to zoom in or out to view the map according to different focus levels. For instance, if the user scans or captures representation 111*a*, the user may be provided a map that shows one or more city blocks (including, for example, the restaurant 101, the office building 103, the parking lot 102 and the park 105), a larger portion of the city (including in addition, for example, the coffee shop 106 and the post office 107), the entire city, the entire state (including, for example, the state capitol building 108), the entire country, or larger or smaller areas of interest. As such, the user may use the techniques described herein to access content that is timely, relevant and useful, and may do so while enjoying a convenient, efficient, and user-friendly user interface experience.

In an implementation, these mapped areas of interest can be automatically generated or supplemented by the handheld device from feedback that the user provides an application running on the handheld device. For example, a restaurant-locating application can use the user's previously entered restaurants to suggest other nearby restaurants that offer similar cuisine. Other geographically related content can include advertisements, promotions, reminders, coupons, etc., for nearby establishments. As another example, a distance from an origination point may be provided, according to some implementations. The content can be used by one or more applications stored on the handheld device. For example, a distance from an origination point can be used by a distance calculation application to determine a distance between captured representations, distance traveled during the course of a trip, a distance from a point of interest to the user's present location, and the like.

Other types of content may also be provided. For example, a business represented by, or displaying a machine-readable representation may wish to advertise a sale or promotion that is presently running, or may wish to offer a coupon or other type of incentive or information. Such a business may be especially interested in advertising the sale or offering the coupon to a user who is presently near the geographic location of the business, as such a user may be more likely to visit the business than would a random recipient not proximate the location of the business at the time of receipt. Similarly, users may appreciate receiving notice of special opportunities that are local to their present location, as this may permit the user to save time, save money, and may reduce the user's search costs in trying to locate a given business, product or service. Additional content can be associated with the location. As another example, content may be extracted from a known location to update currently existing content. For example, content regarding a sale can be extracted from a company's website; also, a coupon can be replicated from a coupon normally available on the Internet. In some implementations, content may be pushed to the mobile device via short message service (SMS) or multimedia message service (MMS).

In an implementation, more than one machine-readable representation may be placed in a same general geographic area. For example, in the city park 105, a first monument can be represented by the first representation 115, while a second nearby monument can be represented by another representation, each of which may contain distinct geographic or other information particular to the associated monument. This can allow implementations to generate very specific content related to a geographic location. For example, the server or handheld device can generate content related to published works that describe the figure or event detailed by the monument. Other examples include using the different proximity of the geographic locations to measure distance traveled. The distance traveled can be used by a workout program to help the user determine how far they have traveled during a workout session, for example.

Figure 2:
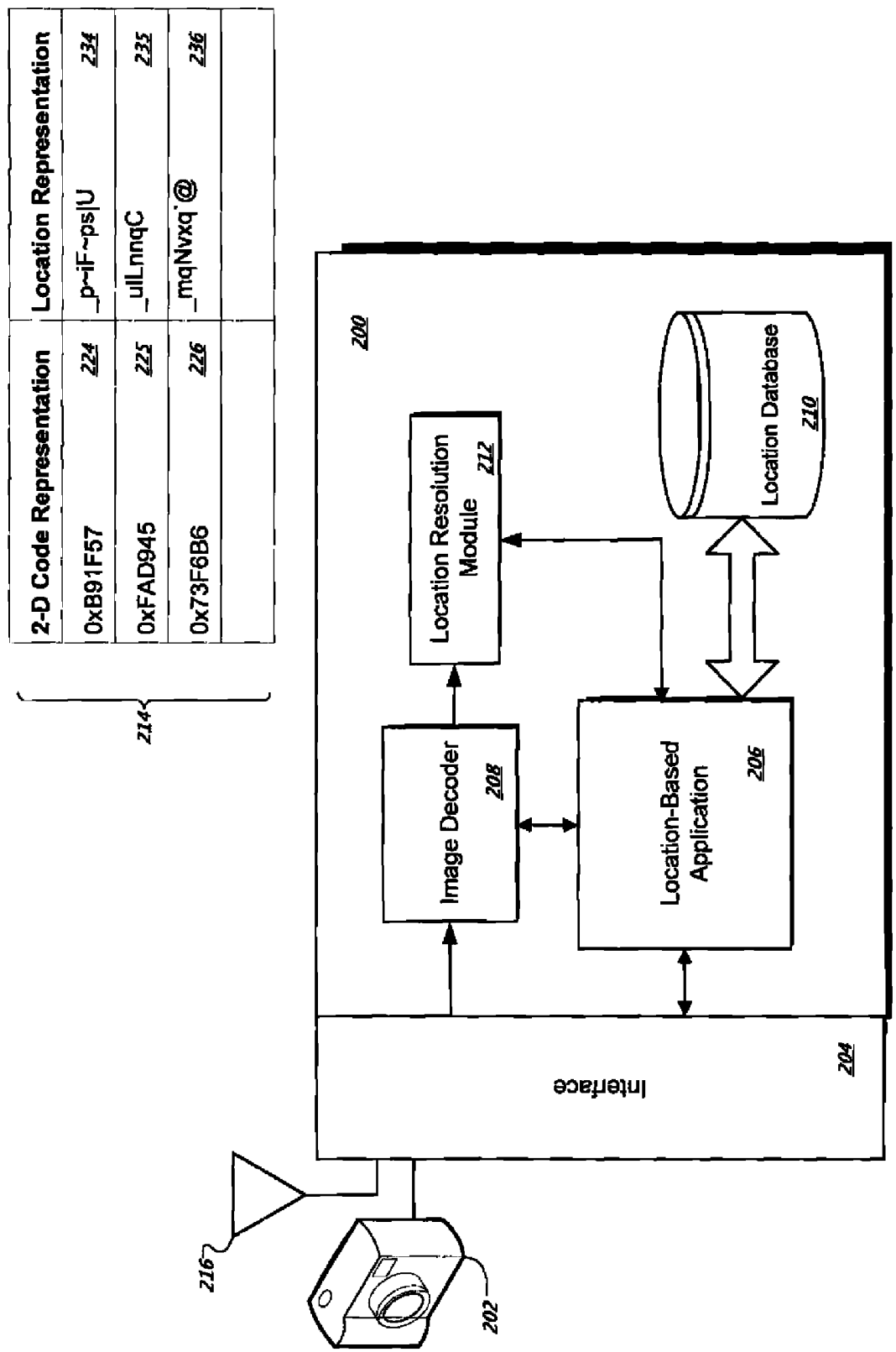
FIG. 2 is a block diagram of an exemplary handheld device that may be used to capture a machine-readable representation of a geographic location.

FIG. 2 is a block diagram of an exemplary handheld device 200 that may be used to capture a machine-readable representation of a geographic location. In an implementation, the handheld device 200 may be a mobile phone. As described previously, the handheld device 200 can include a camera or other device capable of capturing a representation (e.g., an IR scanner or an RF reader), as shown by capture device 202. For clarity, the capture device 202 is shown in FIG. 2 as a peripheral device connected to the handheld device 200 through an interface 204, but in some implementations the capture device 202 is integrated within the handheld device 200. In some implementations, the handheld device 200 is a mobile phone that includes an integrated digital camera 202.

The captured representation can be sent to an image decoder module 208 through the interface 204. The image decoder module 208 can decode the image to obtain an identifier that can be used to resolve the location associated with the representation. The image decoder 208 may decode the image of the captured representation to obtain a numeric identifier, according to an implementation. In some implementations, the image decoder may also be capable of decoding an IR scan, an RF signal, or some combination thereof. According to some implementations, the interface 204 can allow for abstraction between various capture mechanisms. For example, the image decoder 208 may receive representations from a camera, an IR scanner, or an RF reader, as the interface 204 may be capable of generating like data from any of the capture mechanisms, which data the image decoder 208 may then use to decode the representation. The image decoder can pass the numeric representation to a location resolution module 212.

The location resolution module 212 can receive the decoded representation and determine a location identifier. In some implementations, the location identifier can be a number (e.g., 128594), a string (e.g., "38.5, −120.2"), an ASCII value (e.g., "_p~iF~ps|U"), or some combination thereof. In addition, the location identifier may be encoded. For example, as shown by table 214, hexadecimal numeric representations "0xB91F57" (224), "0xFAD945" (225), and "0x73F6B6" (226) can be encoded into ASCII values "_p~iF~ps|U" (234), "_ulLnnqC" (235), and "_mqNvxq'@" (236), respectively. In the example, the encoded location identifiers 234, 235 and 236 may represent latitude and longitude coordinates (38.5, −120.2), (40.7, −120.95) and (43.252, −126.453), respectively, by previously-defined and agreed upon correlations. In some implementations, functionality provided by the image decoder module 208 and the location resolution module 212 can be combined in a single module. According to an implementation, the location resolution module 212 may pass the decoded location identifier to a location-based application 206.

The location-based program application 206 may provide functionality associated with the machine-readable representations. The location-based application 206 may communicate with the interface 204, the image decoder 208, the location resolution module 212, and a location database 210. In one implementation, the location-based application 206 may transmit the location identifier to a remote server over a network using an antenna 216. As is conventional, the antenna 216 may be capable of sending and receiving information. The location-based application may transmit and receive information through the interface 204 and the antenna 216. The information may pass through the network, to be described in more detail below with reference to FIG. 3.

The location identifiers (e.g., identifiers 234-236) can be sent from the location-based application 206 through the interface 204 over a network using antenna 216. Received information can include content associated with a transmitted location identifier. In some implementations, more than one location identifier can be sent by the location-based application. For example, a user may capture more than one geographic representation and transmit them as a bounding region for a map to be generated. The example encoded location identifiers, "_p~iF~ps|U" 234, "_ulLnnqC" 235 and "_mqNvxq'@" 236, can be sent by the location-based application 206 as a single message "_p~iF~ps|U_ulLnnqC_mqNvxq'@," which can be transmitted to the server using antenna 216. Transmitting location identifiers and receiving content is described in more detail in reference to FIG. 3.

The server may use the location identifier to access content associated with the identifier and the associated geographic location where the machine-readable representation was located, and may transmit the content to the mobile device, which may receive the content over a network through the antenna 216 and the interface 204. The location-based program application 206 may then coordinate presentation of the content on the mobile device, and may supplement the content with additional information, if appropriate. As is conventional, input may be received from, and information and content may be provided to, a user over various input/output components (not shown in FIG. 2) of the mobile device, such as a display screen, indicator lights, speaker, keypad, touch screen, voice-activated input component, etc.

The location-based program application 206 can also access content associated with the location identifier from a local data store, according to some implementations. For example, the location-based application 206 can use the location identifier to access a location database 210, where content may be stored. In some implementations, the location resolution module 212 may access the location database 210 to determine the location identifier (interface arrows omitted in FIG. 2 for clarity). In yet other implementations, the captured image may initially be passed through the location-based application 206, where various pre-processing steps may occur, and then to the image decoder 208 and the location resolution module 212 for decoding.

The location-based application 206 can send the location identifiers and their respective decoded representations to a storage unit (e.g., location database 210) so that the location-based application 206 can reuse captured representations by referencing the data store, as described above. For example, the location-based application 206 can store each encoded representation, as shown by representations 224-226, with their respective location identifiers 234-236 in the location database 210. Continuing the example, if the handheld device 200 were later used to capture one of the previously captured machine-readable representations (e.g., representations 111-118), instead of transmitting the decoded representation to the location resolution module 212, the location-based application 206 may simply retrieve the stored value of the location that exists in the location database 210.

Figure 3:
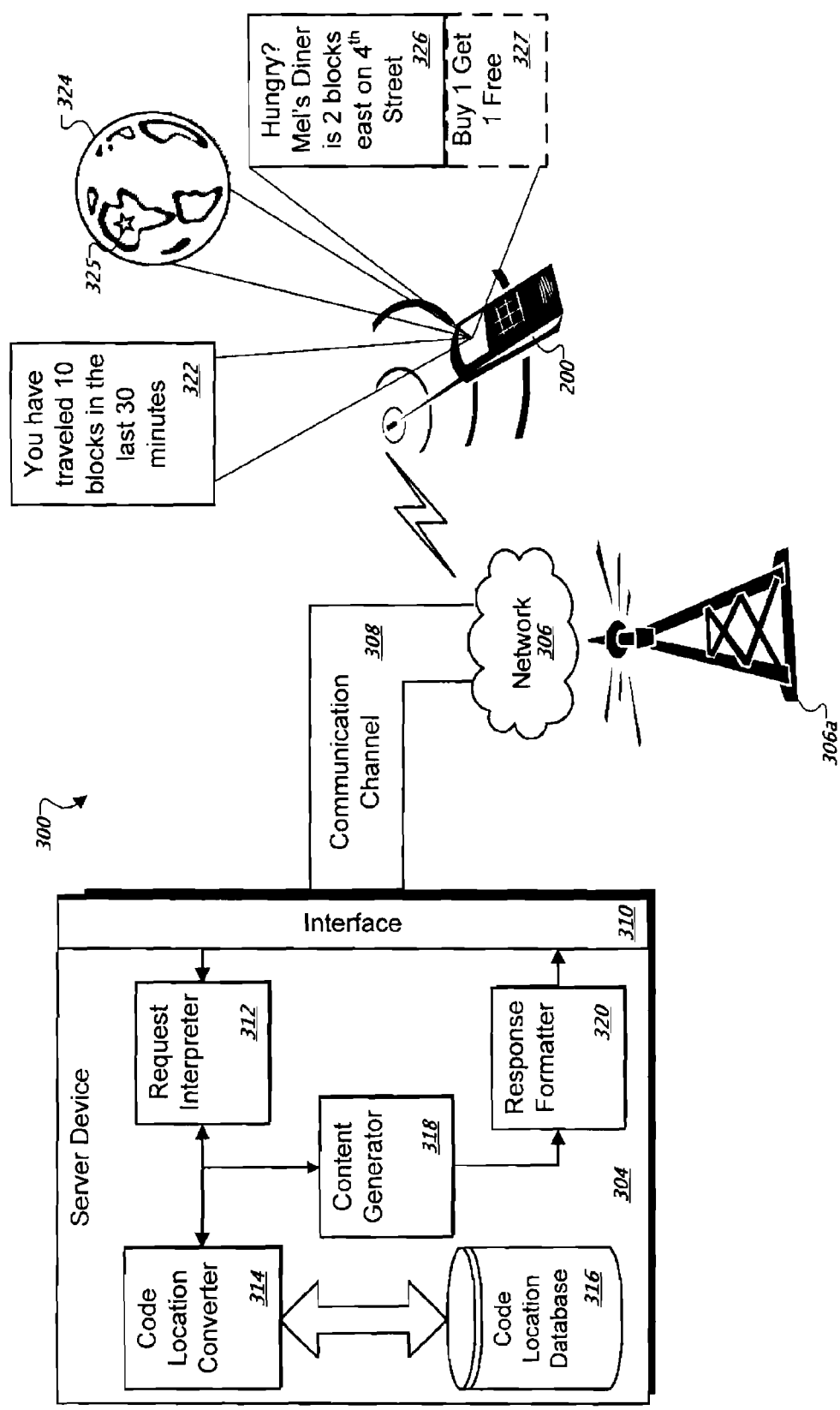
FIG. 3 is a block diagram of an exemplary system that can be used to associate an identification code with a geographic location and provide content related to the geographic location.

FIG. 3 is a block diagram of an exemplary system 300 that can be used to associate an identification code with a geographic location and provide content related to the geographic location. As described previously, a handheld device 200 can transmit a location identifier to one or more server devices 304. In an implementation, the server 304 and the handheld device 200 can communicate over a network 306. For example, the handheld device 200 can transmit one or more location identifiers 234-236 (see FIG. 2) to the server 304 over a network of wireless antennas, as illustrated by antenna 306a in FIG. 3, and the server 304 can similarly transmit information related to the received location identifier to the handheld device 200. The server 304 can use an illustratively shown communication channel 308 to send and receive information over the network 306. The communication channel 308 may permit communication over any number of ports. For example, the communication channel 308 can communicate over the same port that can be used for a Hypertext Transfer Protocol (HTTP) request.

The server 304 can receive and transmit information through an interface 310. For example, as described previously, the handheld device 200 can transmit location identifiers over the network 306. In some implementations, user-related information may also be sent, which may help personalize the user experience. For example, the server may send an HTTP cookie for storage at the device, to be used in future communications between the device and the server. In this fashion, the user-related information can be used to provide content, for example, in a particular language, in a particular format, according to certain preferences, and the like. The location identifiers can be sent through the network 306 over communication channel 308 to the interface 310. In an implementation, the interface 310 may include a Common Gateway Interface (CGI).

The server 304 also includes a request interpreter module 312, a response formatter module 320, a content generator module 318, a code location converter module 314, and a code location database 316, according to an implementation. The request interpreter module 312 may receive and interpret information transmissions received from the interface 310, such as transmissions received over the network 306. The request interpreter 312 can parse the information to generate a request that the other server modules can understand. For example, the request interpreter can generate a "Find_p~iF~ps|U" message and send the message to a code location converter 314.

The code location converter 314 can receive messages from the request interpreter module 312, convert received location identifiers to geographic locations, access a data store, and retrieve content-related information, according to some implementations. This can occur in a variety of ways. For instance, the code location converter 314 can use the location identifier to access a correlation stored in the database 316 that identifies an association between the identifier and a geographic location. As another example, the code location converter 314 can parse a location identifier (e.g., "_p~iF~ps|U") into its corresponding geographic location (e.g., the latitude and longitude coordinates (38.5, −120.2)). It can then access a code location database 316 to retrieve information related to the location (e.g., Mel's Diner is two blocks east on 4th street). The code location converter 314 can send the converted location identifier and any stored data from the code location database 316 to a content generator module 318.

The content generator module 318 can receive information related to one or more geographic locations and generate content that can be displayed by the handheld device 200. For example, the content generator 318 can receive a string from the code location converter 314 that states "Mel's Diner is two blocks east on 4th street." The content generator 318 can use that string to generate a Hypertext Markup Language (HTML) page that contains the string, along with a map, a coupon and restaurant hours, to name a few examples. In various implementations, the content generator 318 may access the database 316 (for clarity, interface arrows not shown in FIG. 3).

In some implementations, the generated content is a set of machine-readable instructions that when executed perform an action on the handheld device 200. For example, the same string "Mel's Diner is two blocks east on 4th street," can be coded into machine-readable instructions that when executed modify the behavior of the location-based application 206 being executed by the handheld device 200. The modified behavior can include populating a portion of the user interface with information, invoking another application, and the like. The content generator module 318 can then send the generated content to a response formatter 320.

The response formatter 320 can receive content generated by the content generator module 318 and prepare the content for transport over the network 306. For instance, the response formatter 320 may generate a message that includes the aforementioned content to be sent over the network 306 to the handheld device 200. As one illustrative example, if the content generator module 318 generates an HTML page, the response formatter 320 may include the HTML page in an HTTP response. The response formatter 320 can send generated responses to the interface 310. The interface 310 can send messages generated by the response formatter 320 to the handheld device over the network 306 using communication channel 308. For example, the interface can send the HTTP request through the communication channel 308 to the network 306 using an appropriate port.

The handheld device 200 can then display the content contained in the response by displaying an HTML page, or by executing machine-readable instructions, to name two examples. The handheld device 200 may host a browser application, which may be used to display content received from the server 304. As illustrated by FIG. 3, example content for display on the handheld device 200 includes a distance traveled during a period of time, as shown by message 322. Another example includes displaying a map, as shown illustratively by map 324. In some implementations, the map 324 can include a location marker, as shown by location marker 325.

In an implementation, a mapping application running on the server 304 may produce a map with identified points of interest for display on the handheld device 200. Yet another example includes an advertisement for a nearby establishment, as shown by advertisement 326 for Mel's Diner. In some implementations, the advertisement can include a coupon to the establishment, as illustrated by the optional coupon 327. In various implementations, users may redeem such coupons in a variety of ways, such as by showing the coupon message to an employee of the corresponding business or by using the mobile device to transmit an electronic message containing the coupon to a receiving device at the corresponding business. In alternative implementations, the coupon may be a rebate that may be later redeemed.

In some implementations, the interface 310 can include the request interpreter 312 and the response formatter 320. In general, the request interpreter 312 and the response formatter 320 would behave in a similar fashion as described above. However, because the three modules 310, 312, and 320 would be integrated in this case, certain message passing and object handling details may differ. For example, instead of creating an object and sending it to the request interpreter module, the interface 310 may instead execute machine-readable instructions (e.g., assembly code) that perform the request interpreter functionality.

It will be understood that the handheld device modules shown in FIG. 2 and the server modules shown in FIG. 3 may be combined or further separated in any number of ways. Further, the techniques disclosed herein may be implemented in hardware or software modules, or a combination or both. Functionality described as occurring at the server 304 may alternatively occur on the handheld device, or vice versa, in some implementations. FIG. 3 shows a single server device 304, but in some implementations more than one server 304 may be used to implement the techniques described herein. Databases or mass storage units may be peripheral to the server 304 or the handheld device 200 in some implementations.

Figure 4:
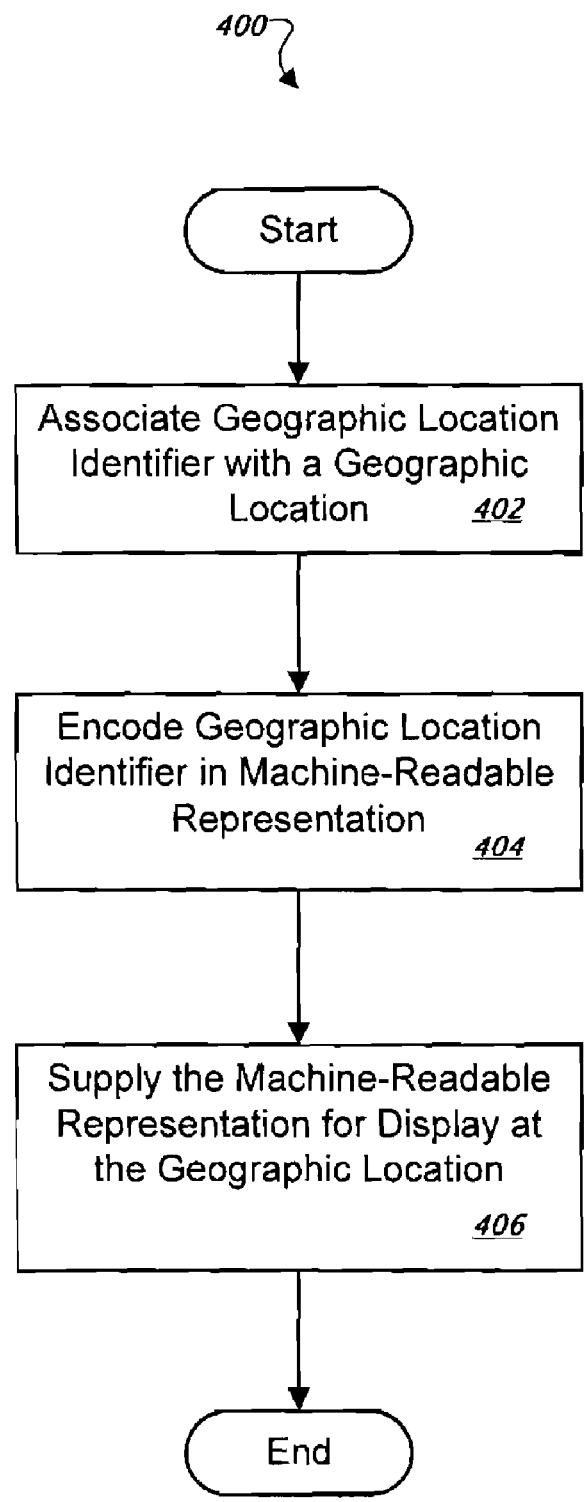
FIG. 4 is a flow chart of an exemplary method for generating a machine-readable representation for display at a location.

FIG. 4 is a flow chart of an exemplary method 400 for generating a machine-readable representation for display at a location. As described previously, one or more servers can associate geographic locations with geographic location identifiers and generate unique machine-readable representations for each location/identifier pair. These representations can then be affixed to various surfaces at the appropriate locations.

At step 402, the server may associate a geographic location identifier with a geographic location, according to an implementation. For example, a coordinate pair specifying a latitude and longitude (e.g., (38.5, −120.2)) and representing a geographic location can be associated with a location identifier (e.g., "_p~iF~ps|U"). The example identifier ("_p~iF~ps|U") may be considered encoded, though in some implementations the location identifier need not be encoded, and can be represented as a string or a number, to name two examples. In an implementation, once the geographic location is associated with a location identifier, the server can encode the location identifier.

At step 404, the server may encode the geographic location identifier into a machine-readable representation, according to an implementation. In an implementation, the server can create a machine-readable representation to represent the location identifier, which represents the associated geographic location. For example, the location identifier "_p~iF~ps|U" can be encoded into a two-dimensional barcode, a barcode, an RF tag, and the like. As an illustrative example, the server may encode the identifier into two-dimensional barcode 111a (see FIG. 1). The two-dimensional barcode 111a may thus encode geographic information that can be captured and decoded by a handheld device, such as a mobile phone. In some implementations, the two-dimensional barcode 111a can also encode information pertaining to an entity associated with the geographic location, e.g., the restaurant 101 in the example of FIG. 1.

In an implementation, once the geographic location identifier has been encoded, it can be supplied to the specified geographic location. The two-dimensional barcode or barcode can be physically produced using known production methods, and using known appropriate materials. For example, the representation can be printed on, or otherwise transferred or affixed to, paper, plastic, wood, metal, or any other appropriate material. Because the representations may be displayed outdoors in some implementations, they may be constructed to withstand environmental elements native to the specified geographic location. In some implementations, descriptive text highlighting the representation may be displayed alongside or near the representation, such as to alert users that they may scan or capture the representation. In some implementations, the representation can be physically created remotely, such as at or near the geographic location destination.

At step 406, the machine-readable representation can be supplied for display at the geographic location. In one implementation, the representation is created and mailed to a recipient for display at the geographic location. In other implementations, the server may transfer a file with information relating to the representation such that the representation can be received remotely and printed or otherwise generated at a remote location. A user may receive an electronic message that permits them to gain remote access to the server (e.g., through a network connection) and allows them to download the representation and print it locally. Alternatively, an electronic copy of the representation can be included in the message.

As one example of the process just described, an organization, such as a franchisor, may identify a number of different geographic locations, such as the locations of various restaurants within its franchisee network. A mailing list for the restaurants may be imported into an application which may then convert the address information to a two-dimensional barcode, and may print the two-dimensional barcode along with the address information in a human-readable format. For example, the two-dimensional barcode can be printed on a sticker and the human-readable address may be printed on a mailing label so that the two-dimensional barcode can be mailed to the appropriate restaurant. The items may be accompanied by instructions telling a manager at each restaurant where to post the two-dimensional barcode (e.g., near a front door, on a promotional poster).

In another example of the process, an entrepreneur may visit a web site for a promotion (e.g., a COCA-COLA® sales promotion) and may use a mapping interface to locate her store on a map. The web site may then generate a screen containing a two-dimensional barcode for the location that the person may print out on a home or business printer, such as onto an adhesive label. The web site could also instruct her what to do with the label.

Figure 5:
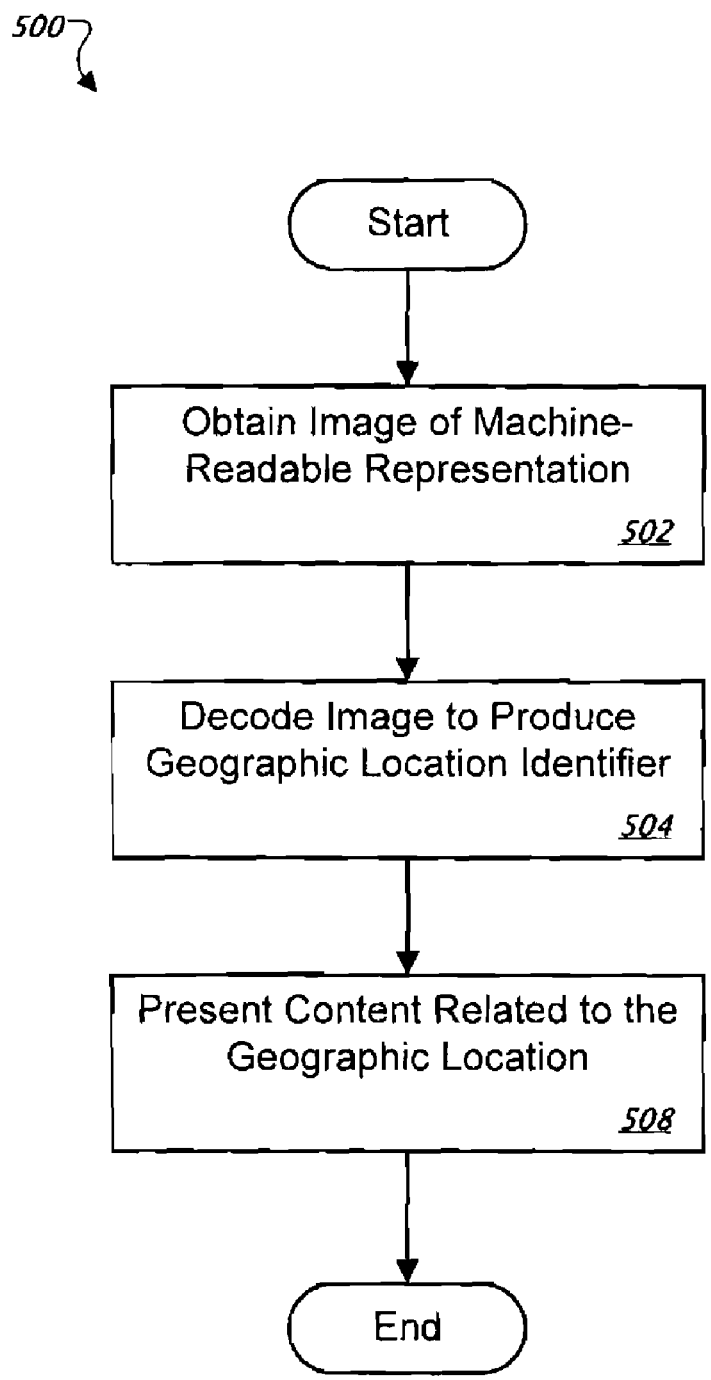
FIG. 5 is a flow chart of an exemplary method for providing content related to a geographic location.

FIG. 5 is a flow chart of an exemplary method 500 for providing content related to a geographic location. In general, the method 500 revolves around capturing an electronic image of a machine-readable code and interpreting the code to produce a location indicator such as a lat/long pair.

As described in reference to FIG. 3, the handheld device 200 can communicate with the server 304 over the network 306. The handheld device 200 can send a location identifier corresponding to a captured machine-readable representation. The server 304 can then generate content related to the captured machine-readable representation.

At step 502, an image of a machine-readable representation may be obtained. For example, the handheld device 200 (FIG. 2) can use an integrated digital camera to capture a machine-readable representation that encodes information pertaining to a geographic location. The machine-readable representation may be a two-dimensional barcode and may encode information pertaining to a location of a structure (e.g., the traffic light 104), building (e.g., the office building 103), landmark (e.g., the state capitol building 108), business (e.g., the coffee shop 106), a point of reference (e.g., the monument described above in reference to the city park 105), or attraction (e.g., the city park 105). In an implementation, after the representation has been captured, it can be decoded to determine a corresponding geographic location identifier.

At step 504, the image can be decoded to produce a geographic location identifier. In an implementation, the handheld device can decode an image of a photographed machine-readable representation, such as a 1D or 2D code. For example, with reference to FIG. 2, the image decoder module 208 in the handheld device 200 can decode the image and transmit the decoded image to the location resolution module 212, which can determine a geographic location identifier from the decoded image.

A geographic location can be identified based on the geographic location identifier. In some implementations, this may occur on the handheld device (as by the location resolution module 212), while in other implementations this may occur at a remote computing system. For example, in reference to FIG. 3, the handheld device 200 can transmit a decoded geographic location identifier over the network 306 to the server 304, where the code location converter module 314 can convert the received location identifier into its corresponding geographic location.

At step 508, content related to the geographic location can be presented. The content can be presented, for example, on a display screen of the handheld device 200. In one implementation, the server 304 can provide content related to the geographic location over the network 306 to the handheld device 200. For example, in reference to FIG. 3, the sever 304 can use the code location database 316 to retrieve information related to the geographic location.

The retrieved information can be sent to the content generator module 318, which can generate the content related to the geographic location. The server 304 can then send the content to the handheld device 200 over the network 306. The content can be displayed by the handheld device 200. For example, a map 324, an advertisement 326, a coupon 327, a message 322, and the like can be displayed. Content can alternatively be generated or retrieved from storage on the handheld device.

In some implementations, the method 500 described above can be executed entirely on a server (e.g., the server 304 of FIG. 3). In step 502, the server can obtain an image of the machine-readable representation from the handheld device and can decode the image. In this case the handheld device may optionally not decode the representation. For example, in reference to FIG. 3, the server 304 can receive the representation captured by the handheld device 200 over the network 306. The server can decode the received image to produce a location identifier, in a fashion similar to the examples described above. The server can then determine the corresponding geographic location and identify, generate, or supply content related to the geographic area for presentation.

In other implementations, some or all of the steps in the method 500 may be executed by the handheld device 200. For example, a portion of the geographic information stored on the server in the above examples (e.g., location codes and content) may be loaded into the handheld device 200 (e.g., by downloading from the server 304). The handheld device 200 may capture and decode the representation as described above in steps 502 and 504, and may then determine the corresponding geographic location and identify or generate content for presentation to a user of the handheld device.

Figure 6:
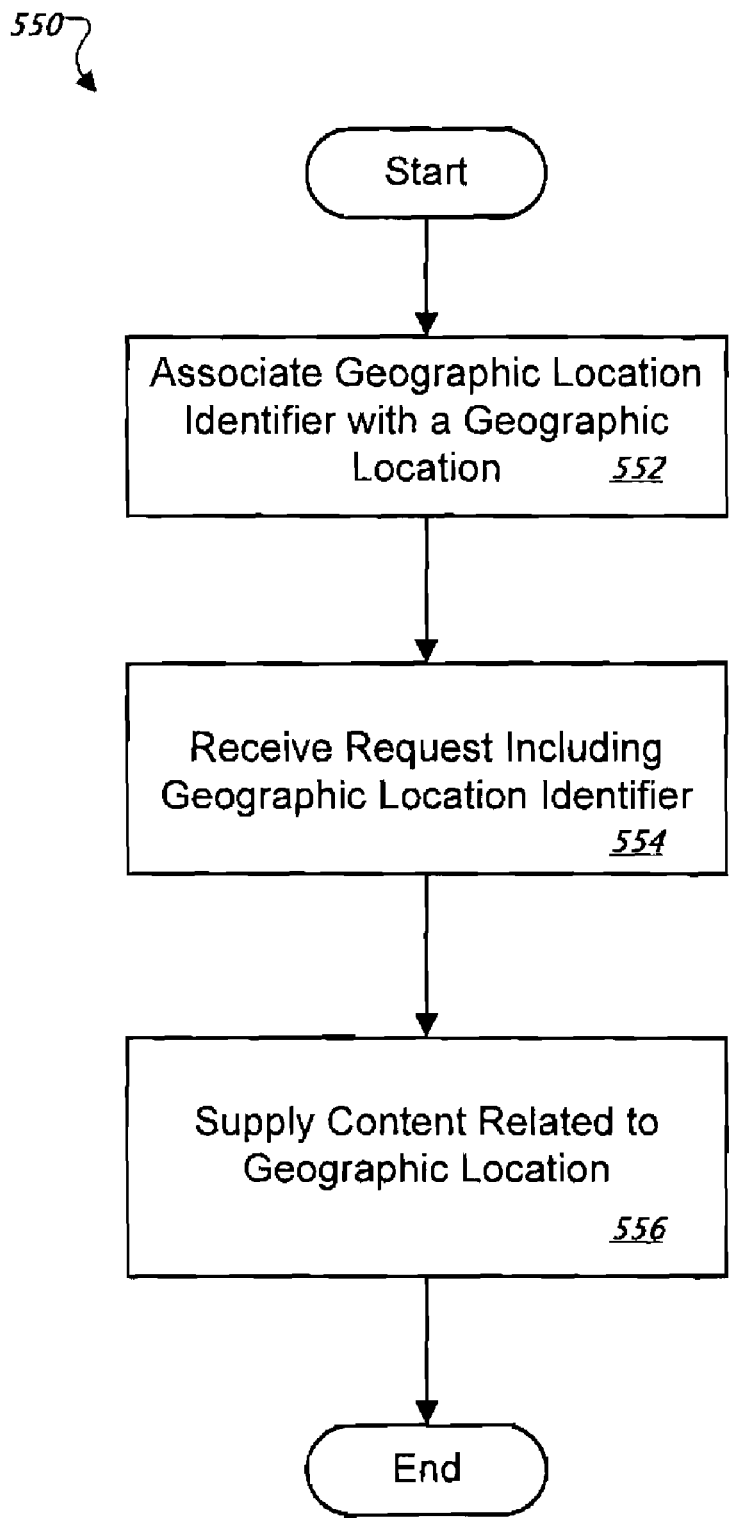
FIG. 6 is a flow chart of an exemplary method for supplying content related to a geographic location.

FIG. 6 is a flow chart of an exemplary method 550 for supplying content related to a geographic location. In an implementation, a geographic location identifier may be associated with a geographic location at step 552. For example, the server 304 may associate a geographic location identifier with a geographic location, such as the location of the state capitol building 108 (see FIG. 1), according to an implementation. This location may be specified, for instance, by a latitude-longitude coordinate pair (e.g., (88.5, −106.2)), for which a corresponding geographic location identifier might be, for example "_j~TF~ps|W." At step 554, a request that includes a geographic location identifier may be received. For example, the server 304 may receive an electronic communication over the network 306 from a handheld device 200, such as a camera-equipped mobile phone. In other implementations, the request may include a non-geographic-location-based identifier, which the server may then use to identify a geographic location, perhaps after first identifying a location identifier.

At step 556, content relating to a geographic location may be supplied. In an implementation, the server 304 may identify a geographic location based on the received identifier, and may access or generate content related to the geographic location and supply it, for example by transmitting the content to the handheld device 200 over the network 306. This can occur in some implementations almost immediately after receiving the identifier, such that a user of the handheld device 200 may receive the content while still at or near the geographic location. In this fashion, the user may be provided with useful content or information that is highly relevant, as it may relate to entities easily accessible to the user given the user's present location near the geographic location of interest.

The methods described in flow charts 400, 500 and 550 can be performed by the handheld device 200, by the remote computing system 304, or by a combination of the two. For example, in some implementations, the methods described in flow charts 400, 500, and 550 may be performed entirely by a mobile handheld device, such as device 200. In other implementations, some methods, such as the method described by flowchart 500, may be performed by the mobile device 200, and other methods, such as the methods described by flowcharts 400 and 550, may be performed by a remote computing system, such as server 304. In yet other implementations, the handheld device 200 and one or more servers may each perform portions of the methods 400, 500, 550.

Associations between machine-readable representations (as well as the corresponding identification codes) and geographic locations can be established in a number of ways. In some implementations, an association between a machine-readable representation and a geographic location can be established at a time when the representation and associated identifier are created. In other implementations, a machine-readable representation may be created, and may later be associated with a geographic location and location identifier. In yet other implementations, a machine-readable representation may be created and associated with a location identifier, each of which may then later be associated with a particular geographic location.

In some implementations, associations between identification codes and geographic locations can be pre-determined. For example, the server 304 can associate a known geographic location with an identification code or an identifier and encode it in a machine-readable representation. This association can be stored at the server 304, such as in the database 316. As such, when a decoded representation is received by the location code converter 314, the converter 314 can access the database 316 to locate the pre-determined association. Associations defined in this manner may be referred to as deterministic assignments, an example of which is described in more detail below with reference to FIG. 7.

In other implementations, associations between identification codes and geographic locations can be determined after the representations are generated. In one illustrative example, a server 304 may be used to encode an identifier in a machine-readable representation. A customer, such as a business owner, may purchase the representation for display at the place of business. Prior to displaying the representation, the owner may communicate with the server 304, such as by logging-on to a website, and may use a mapping application to identify a geographic location, which the server may then associate with the identifier encoded in the representation. The customer might use a desktop or laptop PC to accomplish this registration, or may use a handheld device, such as device 200, according to some implementations.

In some implementations, the communication with the server may include an image of the representation or alternatively may include the identifier, which may be decoded by the handheld device 200 according to some implementations. Once this association has been established, it can be stored in the code location database 316 and subsequently used to process requests from handheld devices that scan or otherwise decode the representation. Associations defined in this manner may be referred to as indeterminate assignments, an example of which is described in more detail below with reference to FIG. 8.

In yet other implementations, some combination of the previously described approaches can be implemented. For example, certain entities, such as longstanding or well-defined structures (e.g., government buildings, monuments, shopping malls, and the like) can have location identifiers and geographic locations representations associated in a pre-determined manner. Other entities (e.g., restaurants, coffee shops, hardware stores, other places of businesses, and the like) can have geographic locations representations generated at one time, and associated to a location identifier at a later time. In this way, the geographic locations can be marketed to a wide range of situations and business applications. For example, a growing business with plans for expansion can purchase a large volume of machine-readable representations to be displayed at the expansion sites without knowing exact locations for the sites at the time of purchase, while another business that already has established geographic locations can present a set of the locations when they purchase representations.

It should be understood that the associations generated by the above example implementations can be generated by the server 304, or by other servers. For example, several servers may assign representations to various geographic locations and may coordinate such assignment among themselves in an appropriate manner. In other implementations, a handheld device may generate the association and may store the association locally, transmit the association to a server 304 for storage, or both.

Figure 7:
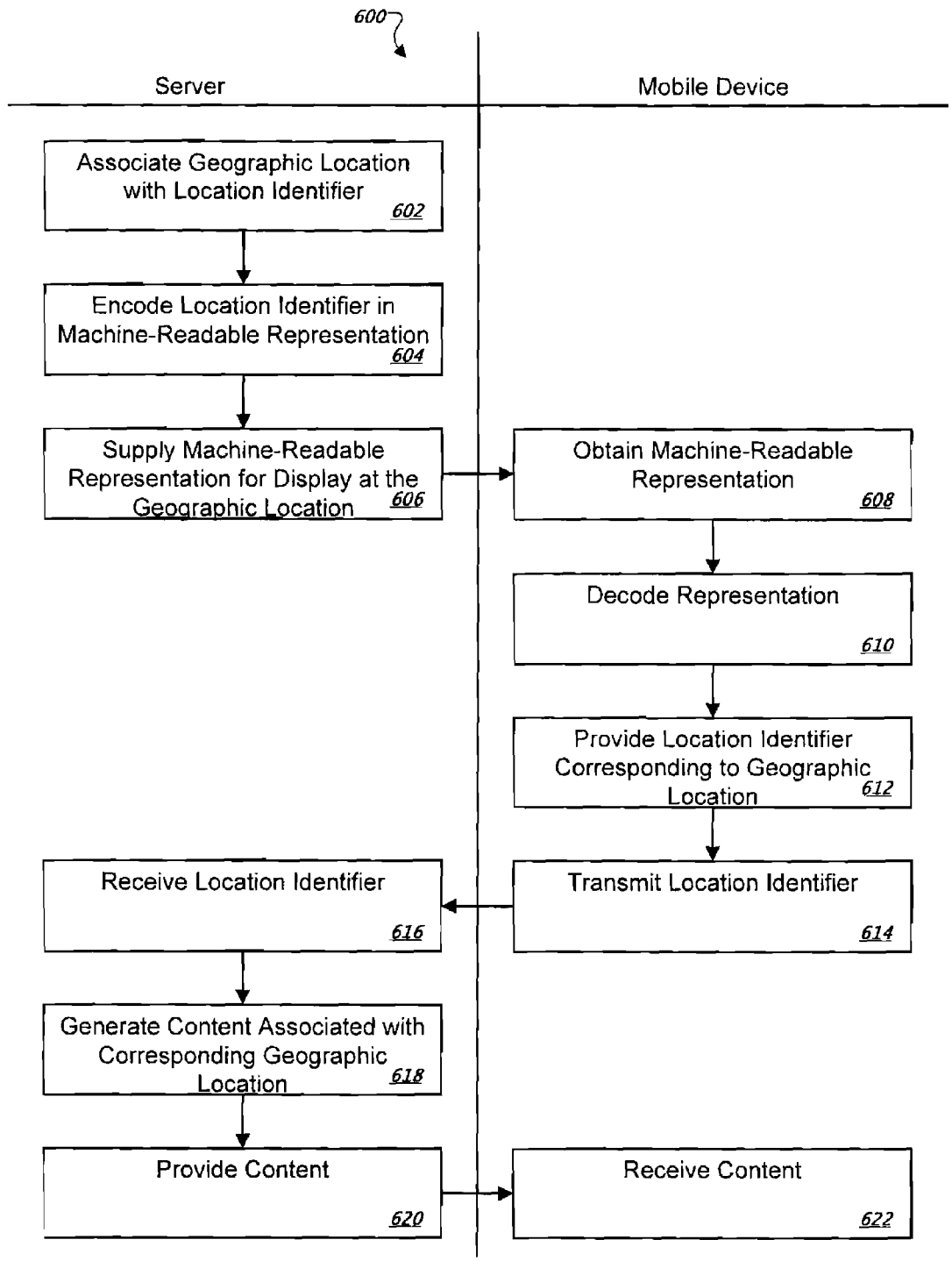
FIG. 7 is a flow chart of exemplary actions by a handheld device and a server in a system for providing content related to a geographic location.

FIG. 7 is a flow chart of exemplary actions 600 by a handheld device and a server in a system for providing content related to a geographic location. As described previously, a party can request one or more machine-readable representations of geographic locations for display at a geographic location. The owner of Mel's Diner, for example, may request a machine-readable representation to display near the entrance of the establishment, such that when a customer scans or takes a picture of the representation, the representation may be decoded and information may be presented to the user. In an implementation, the party (e.g., the owner of Mel's Diner) may specify the content to be provided. In the illustrative flow chart 600 (as well as flow chart 700, described later), actions shown on the left side of the chart may be performed by a server, such as server 304, and actions shown on the right side of the chart 600 may be performed by a mobile device, such as mobile device 200. However, it will be understood that any of the actions shown in the chart may be performed by either the server or the mobile device.

At step 602, a server can associate a geographic location with a location identifier. For example, a server can associate a latitude longitude coordinate pair (38.5,–120.2) with an encoded geographic location identifier, such as "_p~iF~ps|U." This association may be stored for later reference when a query is received that includes the identifier. Next, at step 604, the server can encode the location identifier into a machine-readable representation. For example, referring again to FIG. 1, the geographic location identifier "_p~iF~ps|U" can be encoded as the two-dimensional barcode 111a. The server can supply the machine-readable representation for display at the geographic location at step 606. For example, as described previously, the server can print the image or make the image available for download. In an implementation, the image can be mailed to the location if printed by the server, or printed at the location if downloaded from the server. The representation 111a may be displayed, for example, at the entrance to the restaurant 101 (e.g., Mel's Diner).

At step 608, a mobile device can obtain the machine-readable representation. For example, in reference to FIG. 2, the handheld device 200 can use the digital camera 202 to capture an image of the representation generated in step 604. At step 610, the mobile device can decode the machine-readable representation. For example, in reference to FIG. 2, the handheld device 200 can use the image decoder module 208 to decode an image captured in step 608 to obtain an identifier.

The mobile device can provide a geographic location identifier corresponding to a geographic location at step 612. For example, the handheld device 200 can use the location resolution module 212 to determine a geographic location identifier that corresponds to the representation decoded in step 610. Alternatively, in an implementation, the handheld device 200 can retrieve a previously stored geographic location identifier. For example, the handheld device 200 can retrieve a geographic location identifier from the location database 210.

At step 614, the mobile device can transmit the location identifier determined in step 612 to the server. As an example, the handheld device 200 can transmit the decoded location identifier to the server 304 over the network 306. In an implementation, this transmission may be considered a request for content or information from the server. In some implementations, the location identifier can be decoded directly from the machine-readable representation.

At step 616, the server can receive a geographic location identifier. For example, with reference to FIG. 3, the server 304 can receive a geographic location identifier sent from the mobile device 200 over the network 306 through the interface 310 using the communication channel 308. The interface can then transmit the received location identifier to the request interpreter 312, which can generate a message that can be used by other modules in the server 304 during steps 618 and 620.

The server can generate content that corresponds to the received geographic location identifier at step 618. For example, the server 304 can use the code location converter 314, the code location database 316, and the content generator 318 to convert the received location identifier to a corresponding geographic location (based on the association that occurred, for example, in step 602), and can retrieve content related to the location in the code location database 316. The server can generate a message that includes retrieved content or additional generated content using the content generator module 318. This content can then be provided by the server to the mobile device at step 620. As an example, the content generator 318 can send the content to the response formatter 320, which can format the message for transport to the mobile device 200 through the communication channel 308 and network 306 using interface 310.

At step 622, the mobile device can receive the content and display it. For example, the handheld device 200 can receive the content using antenna 216 and display the content on a display screen of the handheld device 200 or can play audible content over a speaker of the device. In an implementation, content can include a map, a coupon, an advertisement, a message, and the like.

Figure 8:
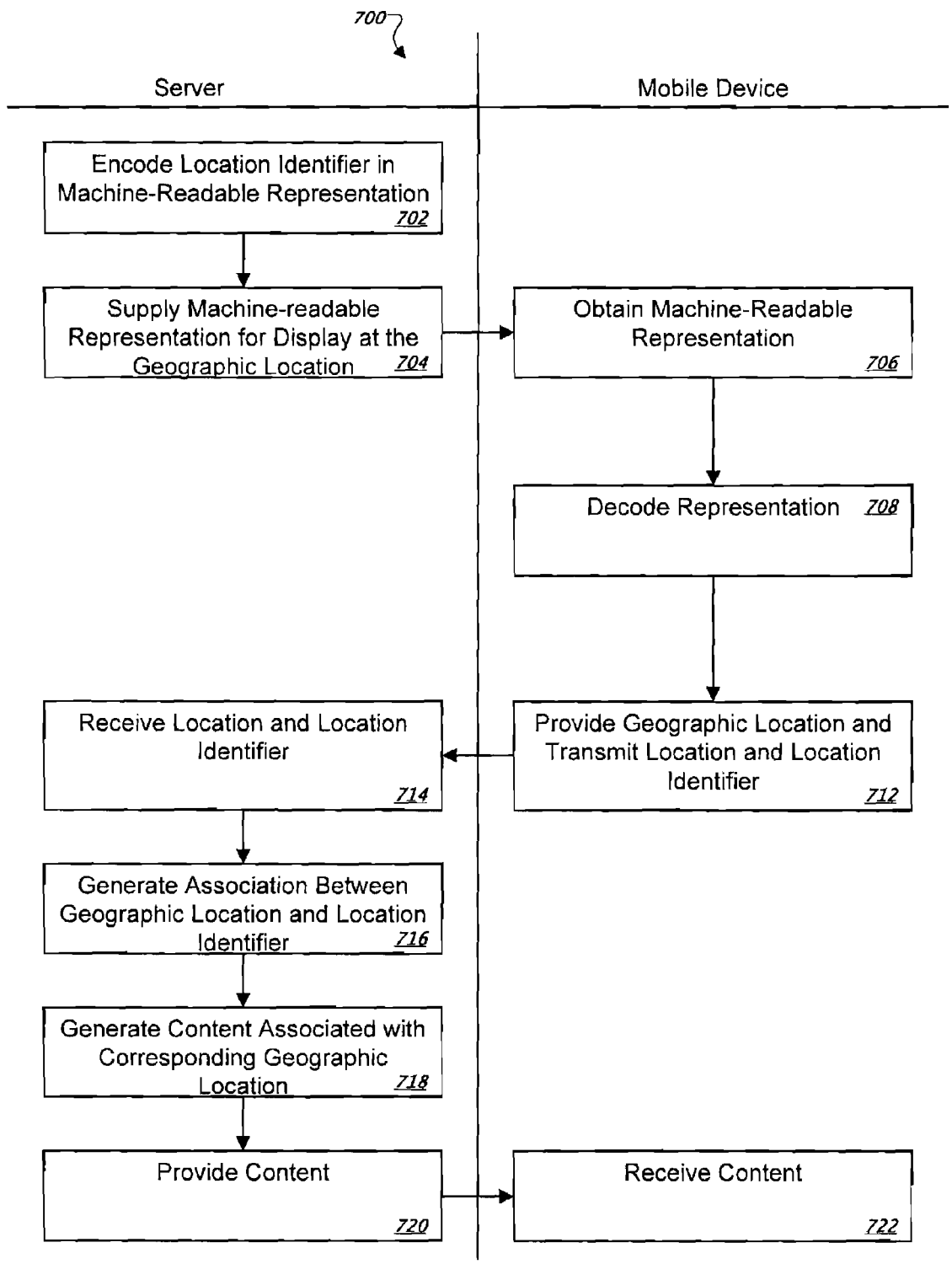
FIG. 8 is a flow chart of exemplary actions by a handheld device and a server in a system for providing content related to a geographic location.

FIG. 8 is a flow chart of exemplary actions 700 by a handheld device and a server in a system for providing content related to a geographic location. At step 702, the server can encode a location identifier into a machine-readable representation. For example, in reference to FIG. 1, the location identifier "_p~iF~ps|U" can be encoded as the two-dimensional barcode 111a. Next, at step 704, the server can supply the machine-readable representation for display at the geographic location.

At step 706, a mobile or handheld device can obtain the machine-readable representation. Referring again to FIG. 2, for example, the handheld device 200 can use the digital camera 202 to capture an image of the representation generated in step 702. At step 708, the mobile device can decode the machine-readable representation to obtain the identifier. At step 712, the mobile device can provide a geographic location and transmit the location and the location identifier to the server. In an implementation, a user can use the mobile device to access a mapping application, running on the server 304 for example, and specify a geographic location to correspond to the location identifier.

In another implementation, the user can use the mobile device to send an address, a description of a location, or latitude-longitude coordinates (e.g., GPS coordinates, decimal degrees, or degrees, minutes and seconds), along with the identifier, via electronic communication to the server 304. In an implementation, the location-based application 206 on the handheld device can additionally prompt the user for a location (e.g., an intersection, an address, a Global Position System (GPS) coordinate, a latitude-longitude coordinate pair, and the like). In an implementation, the location-based application 206 can automatically receive the location. For example, in a GPS-enabled handheld device, the location-based application 206 may communicate with the GPS to determine a location.

At step 714, the server can receive the location and the identifier, and can generate an association between the geographic location and the location identifier at step 716. This association may be stored for later reference, for example in the database 316. At step 718, the server can generate content that corresponds to the received geographic location or geographic location identifier, and can provide the content at step 720, such as by transmitting it to the mobile device. At step 722, the mobile device can receive the content and display it. In various implementations the content can include a map, a coupon, an advertisement, a message containing instructions or information pertaining to the registration, such as instructions on how to upload content or information, and the like.

In some implementations, new associations can replace old associations. For example, suppose an initial association associates a geographic location defined by an address, such as "123 MyWay, MyCity, MyZip," with a geographic location identifier, such as "_p~iF~ps|U." A user may use the techniques described above to submit a new address (or other means of defining a geographic location), such as "321 NewWay, MyCity, NewZip," and the server may associate the location identifier with this new address. In another implementation, associations may be added. Using the previous example, the location identifier "_p~iF~ps|U" may be associated with both "123 MyWay, MyCity, MyZip," and "321 NewWay, MyCity, NewZip," perhaps using a secondary association for the former and a primary association for the latter. This may permit the location-based application to show a history for a machine-readable representation (e.g., the geographical locations that have been represented by the representation) or provide other data querying capabilities.

Figure 9:
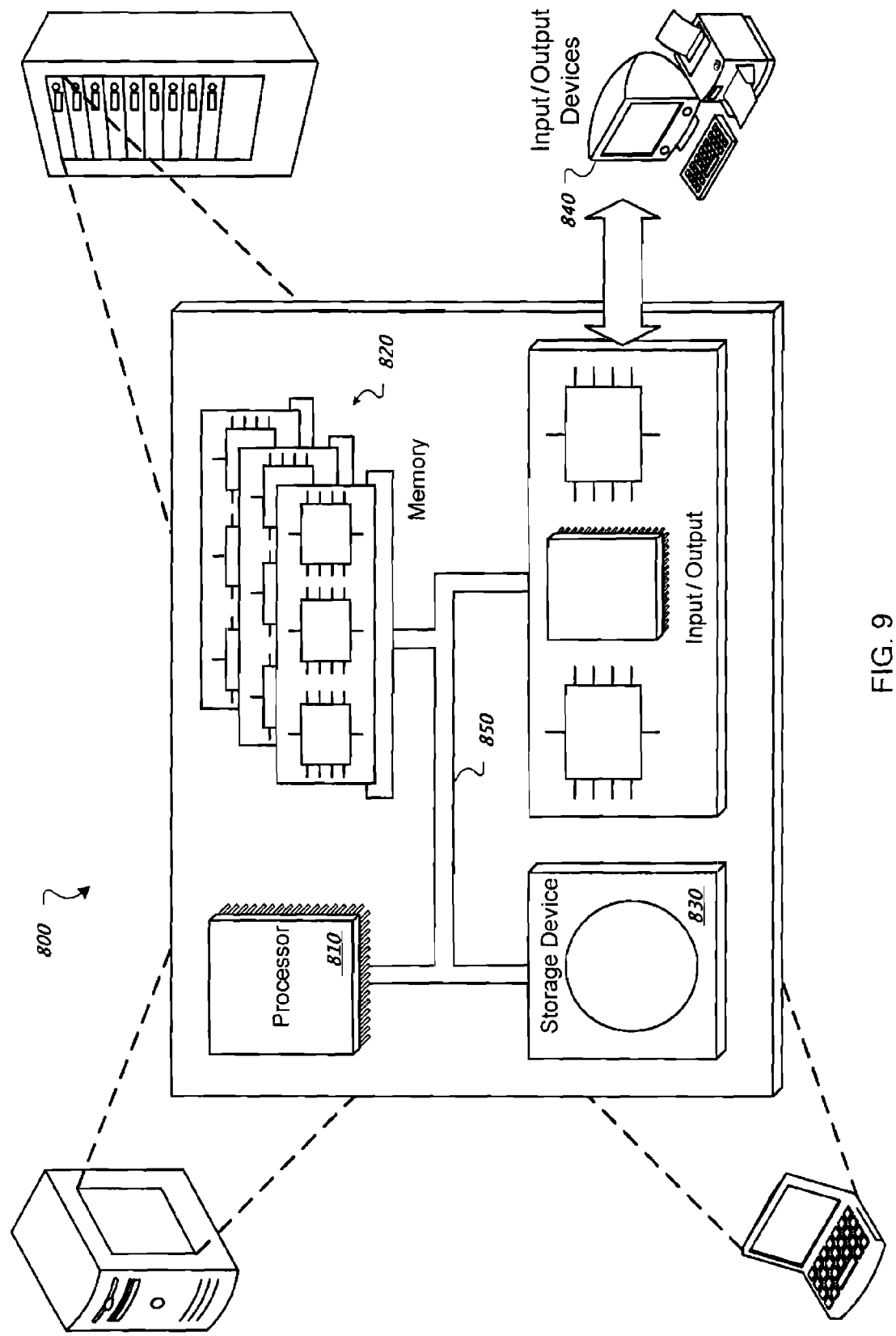
FIG. 9 is a block diagram of a computing system that can be used in connection with computer-implemented methods described in this document.

FIG. 9 is a schematic diagram of a generic computer system 800. The system 800 can be used for the operations described in association with any of the computer-implemented methods described previously, according to some implementations. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user, and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer implemented location identification method, comprising:
   obtaining, at a handheld device, a digital image of a machine-readable representation encoded with a geographic location identifier that is associated with a geographic location;
   decoding, using the handheld device, the image of the machine-readable representation to produce the geographic location identifier;
   identifying, using the handheld device, content related to the geographic location based on the decoded geographic location identifier; and
   presenting the content on a display of the handheld device.

2. The computer-implemented method of claim 1, wherein obtaining the image of the machine-readable representation comprises capturing a digital picture of the machine-readable representation.

3. The computer-implemented method of claim 1, wherein decoding the image of the machine-readable representation comprises comparing the image to representations stored in a database.

4. The computer-implemented method of claim 1, wherein decoding the image of the machine-readable representation comprises first obtaining a non-location-based identifier that is associated with the geographic location identifier, and using the non-location-based identifier to obtain the geographic location identifier.

5. The computer-implemented method of claim 1, wherein the geographic location is a latitude-longitude coordinate pair.

6. The computer-implemented method of claim 1, wherein decoding the image comprises accessing a database that contains pre-defined correlations between particular machine-readable representations and particular geographic locations.

7. The computer-implemented method of claim 1, wherein the content associated with the geographic location comprises two or more members of a group consisting of a map, a coupon, a comment, and a review.

8. A computer program product tangibly embodied in a non-transitory storage medium and comprising instructions that when executed by a processor perform a method, the method comprising:
   obtaining, at a handheld device, an image of a machine-readable representation encoded with a geographic location identifier that is associated with a geographic location;
   decoding, using the handheld device, the image of the machine-readable representation to produce the geographic location identifier;
   identifying, using the handheld device, content related to the geographic location based on the decoded geographic location identifier; and
   presenting the content on a display of the handheld device.

9. The computer program product of claim 8, wherein decoding the image of the machine-readable representation comprises first obtaining a non-location-based identifier that is associated with the geographic location identifier, and using it to obtain the geographic location identifier.

10. The computer program product of claim 8, wherein the geographic location is a latitude-longitude coordinate pair.

11. A handheld device, comprising:
    a digital camera to capture images of location information encoded in a machine-readable format, the location information being associated with a geographic location;
    a decoder to convert codes in the images to an alphanumeric representation;
    means for identifying content related to the geographic location based on the decoded geographic location identifier; and
    a display for presenting the content.

12. The computer-implemented method of claim 1, further comprising:
    determining, using the handheld device, the geographic location based on the geographic location identifier;
    determining, using the handheld device, an area of interest based on the geographic location;
    mapping the area of interest to provide a mapped area of interest; and
    displaying the mapped area of interest on the display.

13. The computer-implemented method of claim 12, further comprising:
    identifying, using the handheld device, one or more locations within the mapped area of interest based on feedback input by a user of the handheld device; and
    displaying the one or more locations on the display.

14. The computer-implemented method of claim 1, further comprising calculating a distance based on the geographic location identifier and an origination point.

15. The computer-implemented method of claim 14, wherein the distance comprises one of a distance between geographic locations, a distance traveled during a trip and a distance between a point of interest and a location of the handheld device.

16. The computer-implemented method of claim 1, further comprising:
    receiving, from a server, an address that is associated with the geographic location based on an association;
    receiving, at the handheld device, user input;
    transmitting the user input to the server to update the association to provide an updated association.

17. The computer-implemented method of claim 1, wherein identifying content related to the geographic location based on the decoded geographic location identifier is achieved without querying a server.

18. The computer program product of claim 8, wherein the method further comprises:
    determining, using the handheld device, the geographic location based on the geographic location identifier;
    determining, using the handheld device, an area of interest based on the geographic location;
    mapping the area of interest to provide a mapped area of interest; and displaying the mapped area of interest on the display.

19. The computer program product of claim 18, wherein the method further comprises:
    identifying, using the handheld device, one or more locations within the mapped area of interest based on feedback input by a user of the handheld device; and
    displaying the one or more locations on the display.

20. The computer program product of claim 8, wherein the method further comprises calculating a distance based on the geographic location identifier and an origination point.

21. The computer program product of claim 20, wherein the distance comprises one of a distance between geographic locations, a distance traveled during a trip and a distance between a point of interest and a location of the handheld device.

22. The computer program product of claim 8, wherein the method further comprises:
    receiving, from a server, an address that is associated with the geographic location based on an association;
    receiving, at the handheld device, user input;
    transmitting the user input to the server to update the association to provide an updated association.

23. The computer program product of claim 8, wherein identifying content related to the geographic location based on the decoded geographic location identifier is achieved without querying a server.

* * * * *